(12) United States Patent
Yao et al.

(10) Patent No.: US 12,290,024 B2
(45) Date of Patent: May 6, 2025

(54) INTELLIGENT SYSTEM AND METHOD FOR COORDINATING HARVESTER AND LOGISTICS VEHICLE

(71) Applicant: FJ Dynamics Technology Co., Ltd, Xiangyang (CN)

(72) Inventors: Yuan Yao, Nanjing (CN); Di Wu, Nanjing (CN); Bo Wang, Xiangyang (CN); Qing-Quan Wang, Xiangyang (CN); Yong-Quan Shen, Xiangyang (CN); Chao Tong, Xiangyang (CN); Shun Fan, Xiangyang (CN)

(73) Assignee: FJ Dynamics Technology Co., Ltd, Xiangyang (CN)

( * ) Notice: Subject to any disclaimer, the term of this patent is extended or adjusted under 35 U.S.C. 154(b) by 814 days.

(21) Appl. No.: 17/490,129

(22) Filed: Sep. 30, 2021

(65) Prior Publication Data

US 2022/0015290 A1 Jan. 20, 2022

Related U.S. Application Data

(63) Continuation-in-part of application No. PCT/CN2019/106980, filed on Sep. 20, 2019.

(30) Foreign Application Priority Data

Apr. 9, 2019 (CN) .......................... 201910280343.0

(51) Int. Cl.
*A01F 7/00* (2006.01)
*A01D 41/12* (2006.01)
(Continued)

(52) U.S. Cl.
CPC ....... *A01D 41/127* (2013.01); *A01D 41/1278* (2013.01); *A01F 7/00* (2013.01);
(Continued)

(58) Field of Classification Search
CPC .... A01D 41/127; A01D 41/12; A01D 41/128; A01D 41/1217; A01D 41/1275;
(Continued)

(56) References Cited

U.S. PATENT DOCUMENTS

| 4,296,409 A | * | 10/1981 | Whitaker | ............. | G07C 5/0825 |
| | | | | | 702/182 |
| 9,009,087 B1 | * | 4/2015 | Mewes | ................ | G06Q 10/067 |
| | | | | | 706/12 |

(Continued)

FOREIGN PATENT DOCUMENTS

| CN | 103149914 | 6/2013 |
| CN | 103181263 | 7/2013 |

(Continued)

OTHER PUBLICATIONS

An abstract of Theses and Dissertations—"Development of a Decision Support System for Capacity Planning From Grain Harvest to Storage" by Aaron P. Turner, University of Kentucky (Year: 2018).*

(Continued)

*Primary Examiner* — Cuong H Nguyen
(74) *Attorney, Agent, or Firm* — ScienBiziP, P.C.

(57) ABSTRACT

An intelligent system and a method for coordinating harvester and logistics vehicle are illustrated. The intelligent system comprises a harvester terminal and a logistics vehicle terminal. The harvester terminal comprises a repository monitoring module and a control module, wherein the repository monitoring module monitors storage information of a storage bin of the harvester. The control module receives the storage information from the repository monitoring module, and determines whether the storage location of the storage bin of the harvester reaches a preset location. The harvester terminal and the logistics vehicle terminal are communicatively connected. When the storage location of the storage bin of the harvester reaches the preset location, (Continued)

the control module sends a transport instruction to the logistics vehicle terminal to control the logistics vehicle to transport grain, thereby achieving intelligent coordination between the harvester and the logistics vehicle.

16 Claims, 4 Drawing Sheets

(51) Int. Cl.
| | | |
|---|---|---|
| *A01D 41/127* | (2006.01) | |
| *A01F 12/18* | (2006.01) | |
| *A01F 12/22* | (2006.01) | |
| *G06Q 10/06* | (2023.01) | |
| *G06Q 10/0631* | (2023.01) | |
| *G06Q 10/08* | (2023.01) | |

(52) U.S. Cl.
CPC .............. *A01F 12/18* (2013.01); *A01F 12/22* (2013.01); *G06Q 10/06* (2013.01); *G06Q 10/06315* (2013.01); *G06Q 10/08* (2013.01)

(58) Field of Classification Search
CPC ....... A01D 41/1271; A01F 7/00; A01F 12/11; A01F 12/18; G06Q 10/08; B60Y 2200/22; B60Y 2200/222; G05B 19/0428; G05B 19/0423; G05B 2219/24015; Y02P 90/02
USPC ...................................... 460/59, 78
See application file for complete search history.

(56) References Cited

U.S. PATENT DOCUMENTS

| | | | | |
|---|---|---|---|---|
| 9,031,884 | B1 * | 5/2015 | Mewes .................. | A01G 13/00 706/12 |
| 9,037,521 | B1 * | 5/2015 | Mewes ................ | A01B 79/005 706/12 |
| 9,076,118 | B1 * | 7/2015 | Mewes .................. | G06N 20/00 |
| 9,087,312 | B1 * | 7/2015 | Mewes .............. | G06Q 10/0631 |
| 9,704,122 | B2 * | 7/2017 | Jung ................ | G06Q 10/06313 |
| 2009/0306835 | A1 | 12/2009 | Ellermann et al. | |
| 2015/0305238 | A1 | 10/2015 | Klausmann et al. | |
| 2017/0135277 | A1 | 5/2017 | Hiramatsu et al. | |
| 2018/0271015 | A1 * | 9/2018 | Redden .................... | G06N 3/08 |
| 2018/0344116 | A1 * | 12/2018 | Schriesheim ........ | G05D 1/0044 |
| 2020/0133262 | A1 * | 4/2020 | Suleman .............. | G05D 1/0278 |
| 2021/0360846 | A1 * | 11/2021 | Qin .................... | G05B 19/0428 |
| 2022/0015290 | A1 * | 1/2022 | Yao .................... | A01D 41/1278 |
| 2022/0122197 | A1 * | 4/2022 | Hanrieder ............ | G05D 1/0044 |

FOREIGN PATENT DOCUMENTS

| | | | | |
|---|---|---|---|---|
| CN | 102244771 | B * | 8/2013 | |
| CN | 106791617 | | 5/2017 | |
| CN | 107278501 | A * | 10/2017 | ............. A01D 41/02 |
| CN | 108279600 | A * | 7/2018 | ......... G05B 19/0423 |
| CN | 105792632 | B * | 2/2019 | ............. A01D 41/12 |
| CN | 110232493 | | 9/2019 | |
| EP | 3165062 | | 5/2017 | |
| WO | WO-2016118686 | A1 * | 7/2016 | ......... G06Q 10/0631 |

OTHER PUBLICATIONS

A simulation model for a rice-harvesting chain by Patrizia Busat (Year: 2014).*
M. Zhang and S. Bhattacharya, "Scheduling and motion planning for autonomous grain carts," 2015 IEEE International Conference on Robotics and Automation (ICRA), Seattle, WA, USA, 2015, pp. 3422-3427, doi: 10.1109/ICRA.2015.7139672. keywords: {Planning;Agricultural machinery;Trajectory;Mathematical model;Vehicles;.*
Zhang, Mengzhe, and Sourabh Bhattacharya. "Scheduling and motion planning for autonomous grain carts." 2015 IEEE International Conference on Robotics and Automation (ICRA). IEEE,. (Year: 2015) (Year: 2015).*
Baidhe, Emmanuel, et al. "Appraisal of Post-Harvest Drying and Storage Operations in Africa: Perspectives on Enhancing Grain Quality." AgriEngineering 6.3 (2024): 3030-3057. (Year: 2024).*
Wang, Bo, et al. "Multi-machine collaboration realization conditions and precise and efficient production mode of intelligent agricultural machinery." International Journal of Agricultural and Biological Engineering 17.2 (2024): 27-36. (Year: 2024).*
Patrizia Busato, A simulation model for a rice-harvesting chain, pp. 149-159, (Year: 2015).*

\* cited by examiner

INTELLIGENT SYSTEM AND METHOD FOR COORDINATING HARVESTER AND LOGISTICS VEHICLE

FIELD

The present disclosure relates to a field of intelligent agricultural machinery, especially relates to an intelligent system and a method for coordinating harvester and logistics vehicle, so that the logistics vehicle can move to the harvester to load grain according to a transportation instruction sent by the harvester, so as to improve operation efficiency.

BACKGROUND

The birth of combine harvester is a great development of agricultural machinery, which not only greatly reduces farmers' hard work among, but also greatly improves operation efficiency. The combine harvester is an integrated machinery for harvesting crops, and the combine harvester can complete harvesting and threshing at one time and convey the grains to a storage bin for storage. In recent years, a domestic harvester technology has developed rapidly. Knapsack wheat harvesters, wheeled self-propelled rice and wheat harvesters, crawler self-propelled rice and wheat harvesters, crawler self-propelled rape harvesters and other mechanical harvesters have been developed. In recent years, there has also been an upsurge in the research and development of longitudinal axial flow rice and wheat combine harvesters, and many longitudinal axial flow rice and wheat harvesters have been launched.

The grain stored in the combine harvester needs to be unloaded, which is generally divided into a manual unloading and mechanical unloading. At present, most of existing combine harvesters in China use manual unloading, that is, manually pulling a switch of a grain unloading port of the storage bin, using gunny bags to receive grain at an opening of the grain unloading port, and then carrying the gunny bags containing grain to home. The manual unloading not only requires a specially assigned person to operate the switch of the grain unloading port of the storage bin all the time, but also involves high labor intensity and troublesome operations. Therefore, some combine harvesters in the market adopt mechanical unloading, that is, the combine harvesters automatically unloads the grain in the storage bin through unloading devices such as grain unloading arm, without additional manual configuration.

When the combine harvester adopts mechanical unloading, an unloading device generally directly unloads the grain into a logistics vehicle, and the logistics vehicle directly transports the grain to the storage bin without using sacks. At present, when many provinces in China implement the 10000 acres good field plan, the combine harvester adopts an unloading mode of the mechanical unloading and logistics vehicle, which can reduce labor intensity and improve the efficiency.

The degree of cooperation between the combine harvester and the logistics vehicle will affect an operation speed and efficiency of the combine harvester. At present, the cooperation between combine and the logistics vehicle is realized through communication between a driver of the combine harvester and a driver of the logistics vehicle driver. This method is inefficient, as message transmission is untimely, and instructions tend to lag behind. In addition, the driver of the logistics vehicle cannot accurately locate a position of the combine harvester, so it is very inconvenient to locate the position through a description of the driver of the combine harvester or through other positioning equipment.

SUMMARY

Present disclosure provides an intelligent system and a method for coordinating harvester and logistics vehicle. By realizing an intelligent communication between a harvester terminal and a logistics vehicle terminal, a timeliness of message and instruction transmission is ensured, so as to improve operation efficiency.

The present disclosure further provides an intelligent system and a method for coordinating harvester and logistics vehicle, wherein the harvester terminal monitors whether the storage bin of the harvester is full, and sends a transportation instruction to the logistics vehicle terminal when a storage location of the storage bin reaches a preset location, so as to facilitate the logistics vehicle terminal to receive and respond to the transportation instruction in time.

The present disclosure further provides an intelligent system and a method for coordinating harvester and logistics vehicle, wherein the preset location of the storage bin of the harvester is lower than a full location of the storage bin, so that the logistics vehicle can be notified when the storage bin is about to be full but not yet full, so as to reduce a waiting time for the logistics vehicle and improve work efficiency. Compared with a scheme that notifying the logistics vehicle only when the storage bin is full, the scheme that the preset location lower than a full location makes a waiting work of the logistics vehicle and a harvesting work parallel, thus saving more time.

The present disclosure further provides an intelligent system and a method for coordinating harvester and logistics vehicle, by the transportation instruction, the position of the harvester can be positioned, so as to facilitate the logistics vehicle and the harvester to get together, increase a coordination degree of the harvester and the logistics vehicle, and improve the operation efficiency. Especially when the harvester is in the working farmland and a driver of the harvester cannot accurately describe the position, the present disclosure can accurately and directly position the harvester.

The present disclosure further provides an intelligent system and a method for coordinating harvester and logistics vehicle, by identifying a position of the storage bin of the logistics vehicle, the harvester terminal can control a grain conveying arm of the harvester to align with the granary of the logistics vehicle to avoid grain leakage out of the storage bin of the logistics vehicle.

The present disclosure further provides an intelligent system and a method for coordinating harvester and logistics vehicle, by monitoring a grain stacking height in the storage bin of the logistics vehicle, the position of the grain conveying arm of the harvester can be adjusted at the harvester terminal, so as to avoid excessive grain stacking at a certain place in the storage bin of the logistics vehicle.

The present disclosure further provides an intelligent system and a method for coordinating harvester and logistics vehicle, by monitoring the grain stacking height in the storage bin of the logistics vehicle, the logistics vehicle terminal can receive instructions to adjust a relative position of the logistics vehicle and the harvester, so as to stagger a pushing height in the storage bin of the logistics vehicle and an outlet position of the grain conveying arm of the harvester, and make full use of the storage of the logistics vehicle.

The present disclosure further provides an intelligent system and a method for coordinating harvester and logistics vehicle, according to a remaining storage space in the storage bin of the logistics vehicle, determining whether to stop grain unloading to avoid an overload of the storage bin of the logistics vehicle.

The present disclosure further provides an intelligent system and a method for coordinating harvester and logistics vehicle, when the grain in the storage bin of the harvester is completely unloaded, the harvester terminal controls the harvester to stop unloading, so there is no need for manual inspection and control.

According to an aspect of the present disclosure, the present disclosure provides an intelligent system and a method for coordinating harvester and logistics vehicle, the system includes:
- a harvester terminal, wherein the harvester terminal comprises a repository monitoring module and a control module, the repository monitoring module monitors storage information of a storage bin of a harvester, the control module receives the storage information from the repository monitoring module, and determines whether a storage location of the storage bin of a harvester reaches a preset location;
- a logistics vehicle terminal communicated with the harvester terminal, wherein when the control module determines that the storage location of the storage bin reaches the preset location, the control module sends a transportation instruction to the logistics vehicle terminal to control a logistics vehicle to move to the harvester for transporting grain.

According to an embodiment of the present disclosure, the harvester terminal comprises a harvester positioning module, the harvester positioning module positions the harvester to obtain position information, the control module sends the transportation instruction accompanying with the position information to the logistics vehicle terminal.

According to an embodiment of the present disclosure, the preset location of the storage bin of the harvester is lower than a full location of the storage bin of the harvester.

According to an embodiment of the present disclosure, the control module includes an unloader control module, the unloader control module controls an unloading device of the harvester, and the unloader control module is triggered by an arrival feedback signal sent by the logistics vehicle terminal to control the unloading device of the harvester to start.

According to an embodiment of the present disclosure, the intelligent system further includes a granary monitoring module of the logistics vehicle configured to obtain a position of the storage bin of the logistics vehicle relative to an unloading port of the harvester, wherein the control module analyzes whether the position of the storage bin of the logistics vehicle relative to an unloading port of the harvester is reasonable.

According to an embodiment of the present disclosure, when the position of the storage bin of the logistics vehicle relative to an unloading port of the harvester is unreasonable, the control module analyzes a reasonable position where unloading grain from the unloading port of the harvester to the storage bin of the logistics vehicle, and the unloader control module controls the unloading device of the harvester to move the unloading port of the harvester to the reasonable position.

According to an embodiment of the present disclosure, when the position of the storage bin of the logistics vehicle relative to the unloading port of the harvester is unreasonable, the control module analyzes a reasonable position of the storage bin of the logistics vehicle relative to an unloading port of the harvester, and sends a position adjustment instruction to the logistics vehicle terminal.

According to an embodiment of the present disclosure, wherein granary monitoring module of the logistics vehicle obtains grain loading of the storage bin, and the control module analyzes whether the storage bin of the logistics vehicle is full according to the grain loading of the storage bin, and when the storage bin of the logistics vehicle is full, the unloader control module controls the unloading device to stop unloading.

According to an embodiment of the present disclosure, the granary monitoring module of the logistics vehicle obtains grain loading of the storage bin, and the control module analyzes whether the storage bin of the logistics vehicle is full according to the grain loading of the storage bin, and when the storage bin of the logistics vehicle is full, the unloader control module controls the unloading device to stop unloading.

According to another aspect of the present disclosure, the control module analyzes whether the storage bin of the harvester is empty according to the storage information of the storage bin of the harvester, and when the storage bin of the harvester is empty, the unloader control module controls the unloading device to stop unloading.

According to another aspect of the present disclosure, the present disclosure provides an intelligent method for coordinating harvester and logistics vehicle, the intelligent method includes:
- step (a): determining whether a storage location of a storage bin of a harvester reaches a preset location according to storage information of a storage bin of the harvester; and
- step (b): when determining that the storage location of the storage bin reaches the preset location, sending a transportation instruction to a logistics vehicle terminal to control a logistics vehicle corresponding to the logistics vehicle to move to the harvester for transporting grain.

According to an embodiment of the present disclosure, the intelligent method further includes:
- step (c): positioning the harvester to obtain position information of the harvester; and
- step (d): when determining that the storage location of the storage bin reaches the preset location, sending the position information to the logistics vehicle terminal.

According to an embodiment of the present disclosure, the intelligent method further includes:
- step (e): obtaining a position of the storage bin of the logistics vehicle relative to an unloading port of the harvester; and
- step (f): analyzing whether the position of the storage bin of the logistics vehicle relative to the unloading port of the harvester is reasonable, and when the position of the storage bin of the logistics vehicle relative to the unloading port of the harvester is unreasonable, adjusting the position of the storage bin of the logistics vehicle relative to the unloading port of the harvester to a reasonable position.

According to an embodiment of the present disclosure, wherein the step (f) further includes:
- step (f.1): analyzing the reasonable position where unloading grain from the unloading port of the harvester to the storage bin of the logistics vehicle; and
- step (f.2): controlling the unloading device of the harvester to move the unloading port of the harvester to the reasonable position.

According to an embodiment of the present disclosure, the step (f) further includes:

step (f.3): analyzing the reasonable position where unloading grain from the unloading port of the harvester to the storage bin of the logistics vehicle; and step (f.4): sending a position adjustment instruction to the logistics vehicle terminal.

According to an embodiment of the present disclosure, the intelligent method further includes:

step (g): when the position of the storage bin of the logistics vehicle relative to the unloading port of the harvester reaches the reasonable position, starting the unloading device of the harvester to unload grain.

According to an embodiment of the present disclosure, the intelligent method further includes:

step (h): according to the storage information of the storage bin of the harvester and grain load of the storage bin of the logistics vehicle, when determining the storage bin of the logistics vehicle is full or the storage bin of the harvester is empty, controlling the unloading device of the harvester to stop unloading.

BRIEF DESCRIPTION OF THE DRAWINGS

Implementations of the present disclosure will now be described, by way of embodiments, with reference to the attached figures.

DETAILED DESCRIPTION

Figure 1:
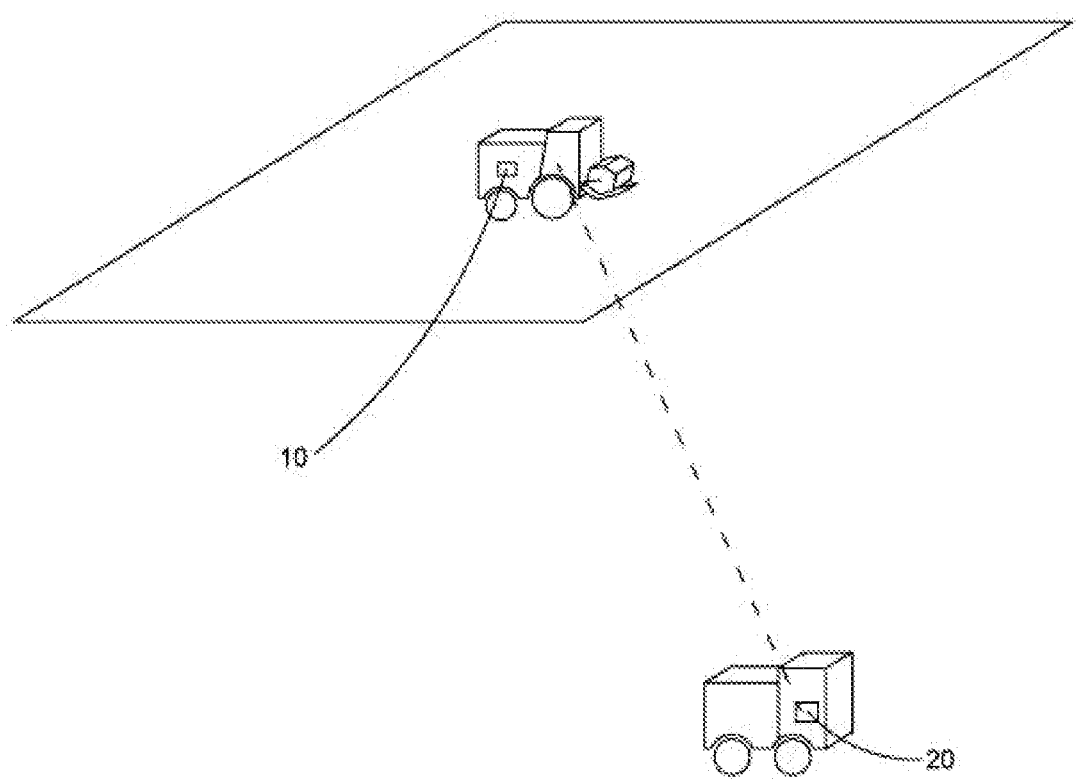
FIG. 1 is an application scenario diagram of one embodiment of an intelligent system for coordinating harvester and logistics vehicle.

The following description is used to disclose the present invention so that the technical personnel in the art can realize the present invention. The preferred embodiments described below are for example only, and technical personnel in the field can think of other obvious variant embodiments. The basic principles of the present invention as defined in the following description may be applied to other embodiments, developed embodiments, improvement schemes, equivalent schemes, and other technical schemes that do not deviate from the spirit and scope of the present invention.

The technical personnel in the art shall understand that, in the disclosure of the present invention, the term "portrait direction", "horizontal direction", "up", "down", "front", "back", "left", "right", "vertical", "horizontal", "top", "bottom", "inside", "outer" and other indicative orientation or positional relationship is based on the orientation or position relationship shown in the drawings, and is intended to facilitate the description of the present invention and simplify the description, rather than to indicate or imply that the device or component must have a specific orientation, in a specific direction and operation, therefore, the above terms are not to be understood as limitations on the present invention.

Understandably, the term "one" should be understood as "at least one" or "one or more", i.e. in one embodiment, the quantity of one component may be one, while in another embodiment the quantity of components may be multiple, and the term "one" cannot be understood as a limit on the quantity.

Figure 2:
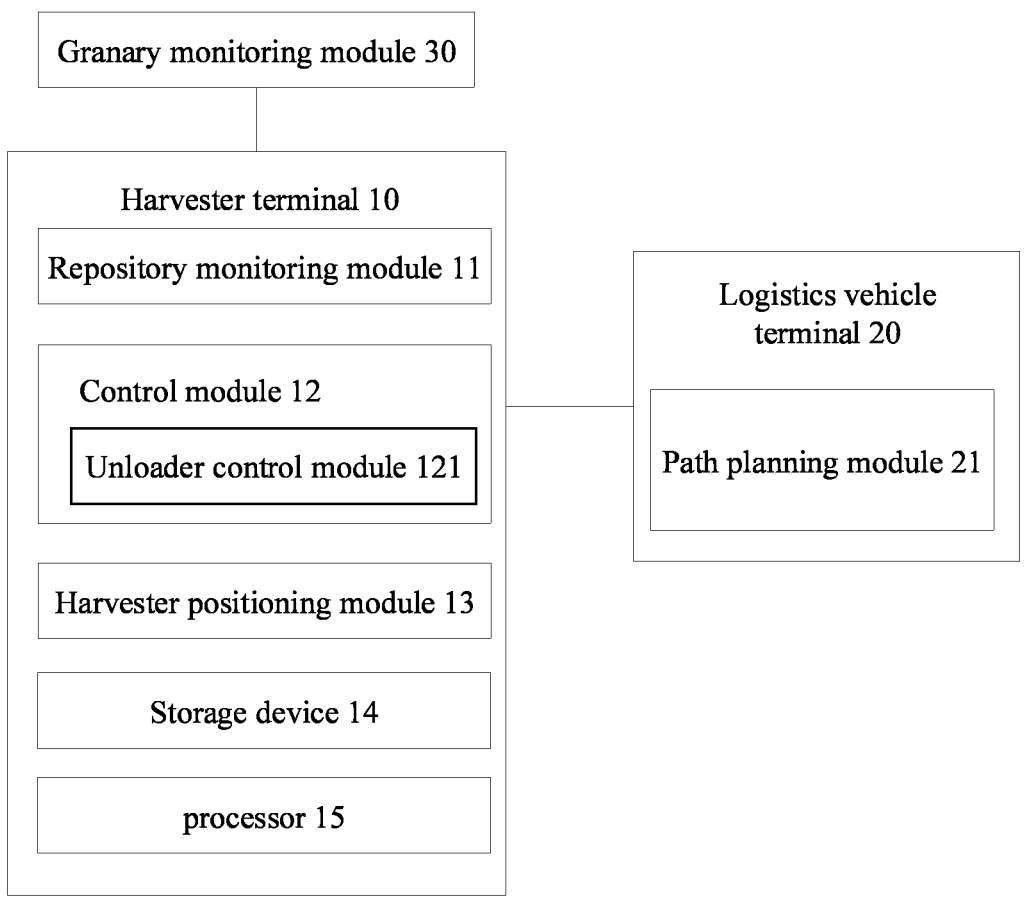
FIG. 2 is a schematic diagram of the intelligent system method for coordinating harvester and logistics vehicle of FIG. 1.

Referring to FIGS. 1 to 2 of the specification of the present invention, an intelligent system and a method for coordinating harvester and logistics vehicle are illustrated. An intelligent cooperation between a harvester and a logistics vehicle is realized, and a timeliness of the transmission of grain unloading and transportation messages and instructions is ensured by an intelligent communication between the harvester terminal 10 and the logistics vehicle terminal 20, to improve an operation efficiency.

Referring to FIG. 2, in one embodiment, the harvester terminal 10 includes a repository monitoring module 11 for monitoring storage information of a storage bin of a harvester. The repository monitoring module 11 can use an imaging technology to capture the storage information in the storage bin, use a gravity sensing technology to determine the storage information in the storage bin by weight, or use a laser ranging to determine a storage height of the grain, etc., which are not limited in present disclosure. The word "module" as used herein, refers to logic embodied in hardware or firmware, or to a collection of software instructions, written in a programming language, such as, for example, Java, C, or assembly. One or more software instructions in the function modules may be embedded in firmware. It will be appreciated that the function modules may include connected logic modules, such as gates and flip-flops, and may include programmable modules, such as programmable gate arrays or processors. The function module described herein may be implemented as either software and/or hardware modules and may be stored in a storage device.

In one embodiment, the harvester terminal 10 further includes, a storage device 14, and at least one processor 15. The at least one processor 15 is used to execute a plurality of modules (e.g., the repository monitoring module 11, a control module 12, and a harvester positioning module 13 shown in FIG. 2) and other applications, such as an operating system, installed in the harvester terminal 10. The storage device 14 stores the computerized instructions of the plurality of modules, and one or more programs, such as the operating system and applications of the harvester terminal 10. The storage device 14 can be any type of non-transitory computer-readable storage medium or other computer storage device, such as a hard disk drive, a compact disc, a digital video disc, a tape drive, a storage card (e.g., a memory stick, a smart media card, a compact flash card), or other suitable storage medium, for example.

The harvester terminal 10 includes a control module 12. The control module 12 receives the storage information from the repository monitoring module 11 and determines whether a storage location of the grain (for example, the storage height of the grain) in the storage bin reaches a preset location. For example, the repository monitoring module 11 can capture the storage information of the storage bin by using a monitoring technology or a camera, and the storage information is transmitted to the control module 12 in the form of images or videos. The control module 12 determines whether the storage location of the grain in the storage bin reaches the preset location according to content of the images or videos. In one embodiment, the repository monitoring module 11 obtains a weight of the stored grain in the storage bin by using the gravity sensing technology, and the storage information is transmitted to the control module 12 in the form of the weight. The control module 12 determines whether the storage location of the grain in the storage bin reaches the preset location according to the weight. In another embodiment, the repository monitoring module 11 obtains the storage height of the grain by a laser ranging technology or a laser ranging finder, and the control module 12 determines whether the storage location of the grain in the storage bin reaches the preset location according to the storage height. That is, according to the different monitoring technologies adopted by the repository monitoring module 11, the control module 12 uses a corresponding analysis technology to determine whether the storage location of the grain in the storage bin reaches the preset location.

In one embodiment, the preset location of the storage bin is lower than a full location of the storage bin (for example full height of the storage bin), so that a wait time for the logistics vehicle and a harvesting operation time can be parallel, reducing the wait time and improving the operation efficiency. In one embodiment, the preset location of the harvester storage bin is fixed. In another embodiment, the control module 12 sets the preset location of the storage bin according to harvesting speed of the harvester, a threshing speed of the harvester and a remaining storage capacity of the storage bin. In other words, the preset location can be set according to a current operation of the harvester and is not fixed.

When determining that the storage position of the storage bin reaches the full location according to the storage information, the control module 12 sends a stop operation instruction to an operation module of the harvester, to avoid an explosion of the storage bin caused by continuous harvesting.

In one embodiment, the harvester terminal 10 includes a harvester positioning module 13 for positioning the position of the harvester. The harvester positioning module 13 can use positioning technologies such as a GPS positioning technology, a Beidou satellite positioning technology, a base station positioning technology, or a Wi-Fi positioning technology, which are not limited in present disclosure.

When the control module 12 determines that the storage location of the storage bin reaches the preset location according to the storage information, the control module 12 sends a transportation instruction and a position information to the logistics vehicle terminal 20. When the control module 12 determines that the storage location of the storage bin reaches the preset location, the control module 12 sends a position acquisition instruction to the harvester positioning module 13, and the harvester positioning module 13 responds to the position acquisition instruction and feeds back the position information of the harvester to the control module 12. In one embodiment, the transportation instruction includes, but is not limited to, number information, type information, driver information, etc. of the harvester.

In one embodiment, the logistics vehicle terminal 20 can be implemented as mobile devices such as mobile phones, tablets and wearable devices, which can be used by the driver of the logistics vehicle. The driver of the logistics vehicle can obtain the transportation instruction and the position information by the logistics vehicle terminal 20 and navigate to the position of the harvester by using a navigation software according to the position information. Alternatively, the logistics vehicle terminal 20 can also be implemented as the assembly of the logistics vehicle, can directly accept the transportation instruction and the location information, and use a self-assembled navigation software to navigate. That is, the logistics vehicle terminal 20 includes a path planning module 21 for planning a driving path of the logistics vehicle terminal 20 to the position of the harvester according to the position information.

When the logistics vehicle reaches the harvester position, the logistics vehicle terminal 20 sends an arrival feedback signal to the harvester terminal 10 to determine that a corresponding harvester has been found. The arrival feedback signal can be manually input by the driver of the logistics vehicle using the logistics vehicle terminal 20, or the logistics vehicle terminal 20 can automatically determine and feedback the harvester according to the distance between a current position of the logistics vehicle and a current position of the harvester.

The control module 12 includes an unloader control module 121 for controlling a unloading device of the harvester. The unloader control module 121 is triggered by the arrival feedback signal sent by the logistics vehicle terminal 20 to control the unloading device of the harvester to start grain unloading.

In one embodiment, the intelligent system for coordinating the harvester and the logistics vehicle includes a granary monitoring module 30 of the logistics vehicle, which is used to monitor the granary information of the storage bin corresponding to the logistics vehicle such as granary position and grain loading of the storage bin. The granary monitoring module 30 of the logistics vehicle can be installed at the harvester, such as an unloading port of a unloading device of the harvester. For example, the granary monitoring module 30 of the logistics vehicle is implemented as an imaging device and installed at the grain unloading port of the unloading device of the harvester, so that a position of the storage bin of the logistics vehicle relative to the grain unloading port of the harvester can be obtained by photographing the storage bin of the logistics vehicle, and the grain loading information of the storage bin can be monitored during a grain unloading process. Alternatively, the granary monitoring module 30 of the logistics vehicle can also be directly installed on the logistics vehicle. For example, the granary monitoring module 30 of the logistics vehicle is installed on a top side of a side wall of the storage bin of the logistics vehicle. The storage bin of the logistics vehicle can also be photographed by a camera technology to obtain the position of the storage bin of the logistics vehicle relative to the grain unloading port of the harvester, and the grain loading information of the storage bin can be monitored during the grain unloading process.

In one embodiment, the control module 12 receives the granary position of the logistics vehicle in the granary information of the logistics vehicle, analyzes an unloading position suitable for the unloading port of the unloading device of the harvester, and the unloader control module 121 controls the unloading device of the harvester to move the unloading port to a reasonable position, so as to avoid grain leakage during an unloading process of the grain. For example, the unloading device of the harvester is implemented as a grain unloading arm, one end of the grain unloading arm is connected to the storage bin of the harvester, and the other end of the grain unloading arm is connected to the grain unloading port. The unloader control module 121 controls the grain unloading arm to rotate and lift, so that the unloading port of the unloading arm is in a reasonable unloading position.

In another embodiment, the control module 12 can analyze whether the position of the storage bin of the logistics vehicle relative to the grain unloading port of the harvester is reasonable according to the granary position of the logistics vehicle in the granary information of the logistics vehicle. If the position of the storage bin of the logistics vehicle relative to the grain unloading port of the harvester is reasonable, the unloader control module 121 starts the unloading device to start unloading. If the position of the storage bin of the logistics vehicle relative to the grain unloading port of the harvester is unreasonable, for example, there is a risk of grain leakage, the control module 12 analyzes a reasonable position of the storage bin of the logistics vehicle relative to the grain unloading port of the harvester and sends a position adjustment instruction to the logistics vehicle terminal 20. In one embodiment, the position adjustment instruction includes, but is not limited to, the reasonable position of the storage bin of the logistics vehicle relative to the grain unloading port of the harvester. The driver of the logistics vehicle can adjust the position of the logistics vehicle and the harvester according to the position adjustment instruction to make the grain unloading port of the harvester aims at the storage bin of the logistics vehicle.

In one embodiment, the control module 12 analyzes whether the storage bin of the logistics vehicle is full according to the grain loading of the storage bin in the granary information of the logistics vehicle. When the storage bin of the logistics vehicle is full, the unloader control module 121 controls the unloading device to stop unloading. In addition, the control module 12 analyzes whether the storage bin of the harvester is empty according to storage information of the storage bin of the harvester. When the storage bin of the harvester is empty, the unloader control module 121 controls the unloading device to stop unloading. That is, when the storage bin of the logistics vehicle is full or the storage bin of the harvester is empty, the unloader control module 121 controls the unloading device to stop unloading and sends an unloading end information to the logistics vehicle terminal 20 so that the logistics vehicle terminal 20 can determines that an unloading work has finished according to the unloading end information.

Figure 3:
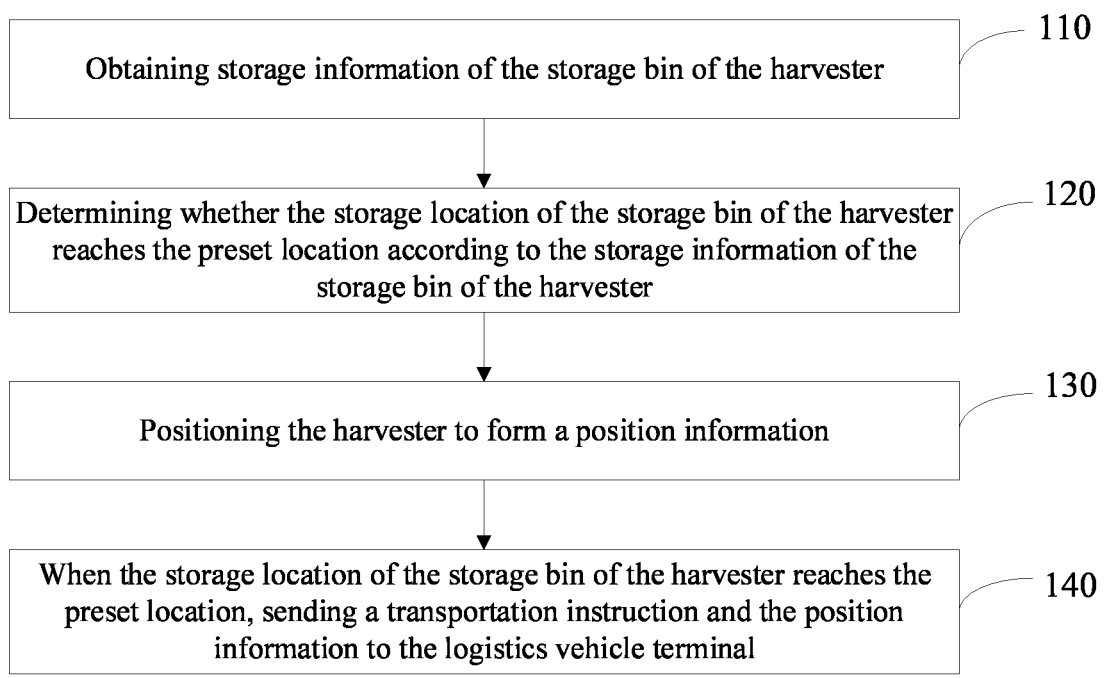
FIG. 3 is a flowchart of an embodiment of an intelligent method for coordinating harvester and logistics vehicle.

According to another aspect of the invention, the invention further provides an intelligent method for coordinating harvester and logistics vehicle. The intelligent system for coordinating harvester and logistics vehicle can be applied in the intelligent method for coordinating harvester and logistics vehicle, so as to realize a purpose and advantage of the invention. FIG. 3 illustrates the flowchart of the intelligent method for coordinating harvester and logistics vehicle.

At block 110, obtaining storage information of the storage bin of the harvester.

An acquisition method for obtaining storage information of the storage bin is not limited. The storage information of the storage bin can be photographed by a camera technology, or the storage information of the storage bin can be determined by weight determined by a gravity induction technology, or the grain storage height can be determined by a laser ranging finder, etc., which are not limited in present disclosure.

At block 120, determining whether the storage location of the storage bin of the harvester reaches the preset location according to the storage information of the storage bin of the harvester.

According to different monitoring technologies used in the acquisition method for obtaining storage information, the corresponding analysis technology can be used to determine whether the storage location of the storage bin of the harvester reaches the preset location. Further, the preset location can be fixed, or the preset location of the storage bin can be set according to a harvesting speed, a threshing speed of the harvester and a remaining storage capacity of the storage bin of the harvester. Namely, the preset location can be set according to a current operation of the harvester and is not fixed.

At block 130, positioning the harvester to form a position information.

In one embodiment, a method for positioning the harvester can use a GPS positioning technology, a Beidou satellite positioning technology, a base station positioning technology or a Wi-Fi positioning Technology, which are not limited in present disclosure.

At block 140, when the storage location of the storage bin of the harvester reaches the preset location, sending a transportation instruction and the position information to the logistics vehicle terminal.

In one embodiment, the preset location of the storage bin of the harvester is lower than a full location of the storage bin, so that a waiting time for waiting the logistics vehicle and a harvesting operation time can be parallel, so as to reduce the waiting time and improve the operation efficiency.

In one embodiment, the logistics vehicle terminal can be implemented as mobile devices such as mobile phones, tablets and wearable devices, which are used by the driver of the logistics vehicle. The driver of the logistics vehicle can obtain the transportation instruction and the position information by the logistics vehicle terminal, and navigate to the position of the harvester by using the navigation software according to the position information. Alternatively, the logistics vehicle terminal can also be implemented as the assembly of the logistics vehicle, can directly receive the transportation instruction and the location information, and use a self-assembled navigation software to navigate.

Figure 4:
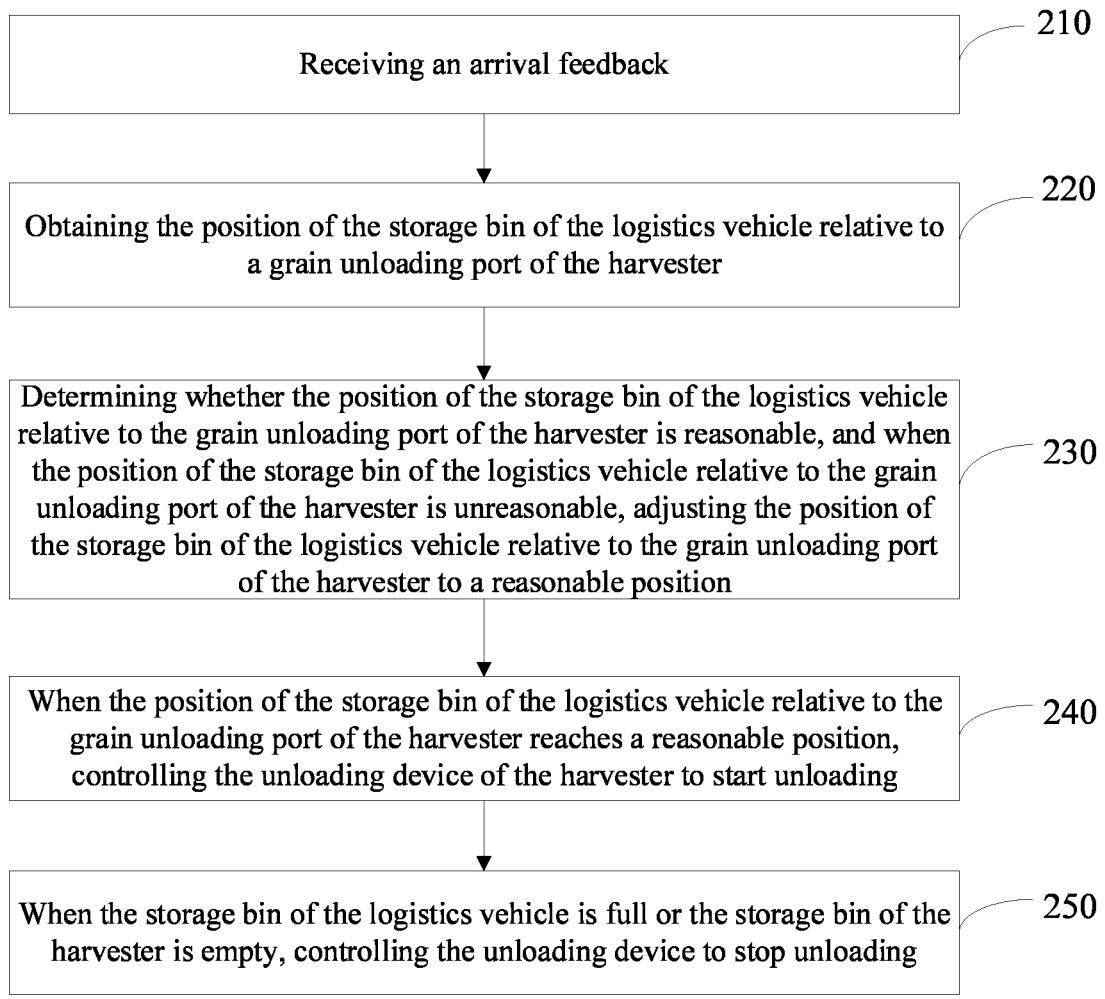
FIG. 4 is a flowchart of an embodiment of a grain unloading method used in the intelligent method for coordinating harvester and logistics vehicle of FIG. 3.

FIG. 4 illustrates a flowchart of an embodiment of a grain unloading method used in the intelligent method for coordinating harvester and logistics vehicle. When the logistics vehicle reaches the position the harvester, the grain unloading method as shown in the FIG. 4 can be executed.

At block 210, receiving an arrival feedback.

The logistics vehicle determines that the logistics vehicle has found the corresponding harvester according to the arrival feedback. The arrival feedback can be manually input by the driver of the logistics vehicle, or the arrival feedback can be automatically determined and fed back according to a distance between the position of the logistics vehicle and the current position of the harvester.

At block 220, obtaining the position of the storage bin of the logistics vehicle relative to a grain unloading port of the harvester.

The position of the logistics vehicle relative to the grain unloading port of the harvester can be obtained by a camera device, and the camera device can be installed on the harvester or the logistics vehicle, which are not limited in present disclosure.

At block 230, determining whether the position of the storage bin of the logistics vehicle relative to the grain unloading port of the harvester is reasonable, and when the position of the storage bin of the logistics vehicle relative to the grain unloading port of the harvester is unreasonable, adjusting the position of the storage bin of the logistics vehicle relative to the grain unloading port of the harvester to a reasonable position.

The storage bin of the logistics vehicle needs to be located at a path where the grain is discharged from the grain unloading port, so that the grain can be received by the storage bin. Therefore, if the position of the storage bin of the logistics vehicle relative to the grain unloading port of the harvester is unreasonable, for example, if the distance is too far, the grain will not reach the storage bin, and if the distance is too close, the grain will cross the storage bin when discharged, and the grain cannot be received reasonably and effectively. When the positions of the storage bin of the logistics vehicle relative to the grain unloading port of the harvester are unreasonable, the position of the storage bin of the logistics vehicle relative to the grain unloading port of the harvester can be adjusted by moving the position of the grain unloading port of the harvester or by moving the logistics vehicle, which are not limited in present disclosure.

At block 240, when the position of the storage bin of the logistics vehicle relative to the grain unloading port of the harvester reaches a reasonable position, controlling the unloading device of the harvester to start unloading.

At block 250, when the storage bin of the logistics vehicle is full or the storage bin of the harvester is empty, controlling the unloading device to stop unloading.

Those skilled in the art should understand that the above description and the embodiments of the present disclosure shown in the drawings are only examples and do not limit the present disclosure. The purpose of the present disclosure has been completely and effectively achieved. The function and structure principle of the present disclosure have been shown and explained in the embodiments. Without departing from the principle, the implementation of the present disclosure may have any deformation or modification.

What is claimed is:

1. An intelligent system for coordinating harvester and logistics vehicle, comprising:
    a harvester terminal, wherein the harvester terminal comprises a repository monitoring module and a control module, the repository monitoring module monitors storage information of a storage bin of the harvester, the control module receives the storage information from the repository monitoring module, and determines whether a storage level of the storage bin reaches a preset level; and
    a logistics vehicle terminal communicated with the harvester terminal, wherein when the control module determines that the storage level of the storage bin reaches the preset level, the control module sends a transportation instruction to the logistics vehicle terminal to control a logistics vehicle to move to the harvester for transporting grain, the control module sets the preset level of the storage bin according to a harvesting speed of the harvester, a threshing speed of the harvester and a remaining storage capacity of the storage bin.

2. The intelligent system for coordinating harvester and logistics vehicle of claim 1, wherein the harvester terminal further comprises:
    a harvester positioning module, the harvester positioning module positions the harvester to obtain position information, the control module sends the transportation instruction with the position information to the logistics vehicle terminal.

3. The intelligent system for coordinating harvester and logistics vehicle of claim 1, wherein the preset level of the storage bin of the harvester is lower than a full location of the storage bin of the harvester.

4. The intelligent system for coordinating harvester and logistics vehicle of claim 1, wherein the control module comprises:
    an unloader control module, the unloader control module controls an unloading device of the harvester, and the unloader control module is triggered by an arrival feedback signal sent by the logistics vehicle terminal to control the unloading device of the harvester to start.

5. The intelligent system for coordinating harvester and logistics vehicle of claim 4, further comprising:
    a granary monitoring module of the logistics vehicle configured to obtain a position of the storage bin of the logistics vehicle relative to an unloading port of the harvester, wherein the control module analyzes whether the position of the storage bin of the logistics vehicle relative to an unloading port of the harvester is reasonable.

6. The intelligent system for coordinating harvester and logistics vehicle of claim 5, wherein when the position of the storage bin of the logistics vehicle relative to an unloading port of the harvester is unreasonable, the control module analyzes a reasonable position where unloading grain from the unloading port of the harvester to the storage bin of the logistics vehicle, and the unloader control module controls the unloading device of the harvester to move the unloading port of the harvester to the reasonable position.

7. The intelligent system for coordinating harvester and logistics vehicle of claim 5, wherein when the position of the storage bin of the logistics vehicle relative to the unloading port of the harvester is unreasonable, the control module analyzes a reasonable position of the storage bin of the logistics vehicle relative to an unloading port of the harvester and sends a position adjustment instruction to the logistics vehicle terminal.

8. The intelligent system for coordinating harvester and logistics vehicle of claim 5, wherein the granary monitoring module of the logistics vehicle obtains grain loading of the storage bin, and the control module analyzes whether the storage bin of the logistics vehicle is full according to the grain loading of the storage bin, and when the storage bin of the logistics vehicle is full, the unloader control module controls the unloading device to stop unloading.

9. The intelligent system for coordinating harvester and logistics vehicle of claim 4, wherein the control module analyzes whether the storage bin of the harvester is empty according to the storage information of the storage bin of the harvester, and when the storage bin of the harvester is empty, the unloader control module controls the unloading device to stop unloading.

10. An intelligent method for coordinating harvester and logistics vehicle, comprising:
    determining whether a storage level of a storage bin of the harvester reaches a preset level according to storage information of the storage bin, wherein, the preset level of the storage bin is set according to a harvesting speed of the harvester, a threshing speed of the harvester and a remaining storage capacity of the storage bin; and
    when determining that the level of the storage bin reaches the preset level, sending a transportation instruction to a logistics vehicle terminal to control the logistics vehicle to move to the harvester for transporting grain.

11. The intelligent method for coordinating harvester and logistics vehicle of claim 10, further comprising:
    positioning the harvester to obtain position information of the harvester; and
    when determining that the storage level of the storage bin reaches the preset level, sending the position information to the logistics vehicle terminal.

12. The intelligent method for coordinating harvester and logistics vehicle of claim 10, further comprising:
    obtaining a position of the storage bin of the logistics vehicle relative to an unloading port of the harvester; and
    analyzing whether the position of the storage bin of the logistics vehicle relative to the unloading port of the harvester is reasonable, and when it is unreasonable, adjusting the position of the storage bin of the logistics vehicle relative to the unloading port of the harvester to a reasonable position.

13. The intelligent method for coordinating harvester and logistics vehicle of claim 12, wherein analyzing whether the position of the storage bin of the logistics vehicle relative to the unloading port of the harvester is reasonable, and when it is unreasonable, adjusting the position of the storage bin of the logistics vehicle relative to the unloading port of the harvester to a reasonable position further comprises:

analyzing the reasonable position for unloading grain from the unloading port of the harvester to the storage bin of the logistics vehicle; and controlling an unloading device of the harvester to move the unloading port of the harvester to the reasonable position.

14. The intelligent method for coordinating harvester and logistics vehicle of claim 12, wherein the analyzing whether the position of the storage bin of the logistics vehicle relative to the unloading port of the harvester is reasonable, and when it is unreasonable, adjusting the position of the storage bin of the logistics vehicle relative to the unloading port of the harvester to a reasonable position further comprises:

analyzing the reasonable position for unloading grain from the unloading port of the harvester to the storage bin of the logistics vehicle; and sending a position adjustment instruction to the logistics vehicle terminal.

15. The intelligent method for coordinating harvester and logistics vehicle of claim 12, further comprising:

when the position of the storage bin of the logistics vehicle relative to the unloading port of the harvester reaches the reasonable position, starting an unloading device of the harvester to unload grain.

16. The intelligent method for coordinating harvester and logistics vehicle of claim 15, further comprising:

according to the storage information of the storage bin of the harvester and grain load of the storage bin of the logistics vehicle, when determining the storage bin of the logistics vehicle is full or the storage bin of the harvester is empty, controlling the unloading device of the harvester to stop unloading.

\* \* \* \* \*